(12) United States Patent
Coker et al.

(10) Patent No.: US 9,868,636 B1
(45) Date of Patent: Jan. 16, 2018

(54) THERMOCHEMICALLY ACTIVE IRON TITANIUM OXIDE MATERIALS

(71) Applicant: Sandia Corporation, Albuquerque, NM (US)

(72) Inventors: Eric Nicholas Coker, Albuquerque, NM (US); James E. Miller, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 21 days.

(21) Appl. No.: 14/097,385

(22) Filed: Dec. 5, 2013

Related U.S. Application Data

(60) Provisional application No. 61/734,234, filed on Dec. 6, 2012.

(51) Int. Cl.
*C01B 3/06* (2006.01)
*C01B 3/00* (2006.01)
*C01B 31/18* (2006.01)

(52) U.S. Cl.
CPC .............. *C01B 3/063* (2013.01); *C01B 31/18* (2013.01)

(58) Field of Classification Search
None
See application file for complete search history.

(56) References Cited

U.S. PATENT DOCUMENTS

| | | | |
|---|---|---|---|
| 5,447,024 A * | 9/1995 | Ishida et al. ................... 60/775 |
| 2002/0155037 A1 * | 10/2002 | Otsuka et al. ................ 422/168 |
| 2009/0000194 A1 * | 1/2009 | Fan .......................... C01B 3/16 48/199 R |
| 2011/0054049 A1 * | 3/2011 | Lambert et al. .............. 518/719 |
| 2013/0252808 A1 * | 9/2013 | Yamazaki et al. ............ 502/303 |

FOREIGN PATENT DOCUMENTS

| WO | WO 2007/082089 | * | 7/2007 |
| WO | WO 2009/138595 | * | 11/2009 |

OTHER PUBLICATIONS

Ilmenite with addition of NiO as oxygen carrier for chemical-looping combustion Magnus Ryden et al. Fuel, vol. 89, pp. 3523-3533, 2010.*

Ilmenite Activation during Consecutive Redox Cycles in Chemical-Looping Combustion Juan Adanez et al. Energy and Fuels, vol. 24, pp. 1402-1413, Jan. 7, 2010.*

Titania-supported iron oxide as oxygen carrier for chemical-looping combustion of methane Beatriz M. Corbella and Jose Maria Palacios Fuel vol. 86, pp. 113-122, 2007.*

* cited by examiner

*Primary Examiner* — Douglas B Call
(74) *Attorney, Agent, or Firm* — Daniel J. Jenkins

(57) ABSTRACT

A thermal oxidation-reduction cycle is disclosed that uses iron titanium oxide as the reactive material. The cycle may be used for the thermal splitting of water and/or carbon dioxide to form hydrogen and/or carbon monoxide. The formed compounds may be used as syngas precursors to form fuels.

12 Claims, No Drawings

THERMOCHEMICALLY ACTIVE IRON TITANIUM OXIDE MATERIALS

CROSS-REFERENCE TO RELATED APPLICATIONS

This application claims priority to U.S. Provisional Patent Application No. 61/734,234, filed on Dec. 6, 2012, entitled "THERMOCHEMICALLY ACTIVE IRON TITANIUM OXIDE MATERIALS", the entirety of which is incorporated herein by reference.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

FIELD

The present disclosure is generally directed to thermochemical reaction technology, and is more particularly directed to compounds containing iron and titanium oxides used in thermal oxidation-reduction cycles for splitting carbon dioxide and/or water into carbon monoxide and/or hydrogen, respectively.

BACKGROUND

It has been proposed to use solar generated photovoltaic electricity to drive electrolysis or photons to drive photolysis to generate hydrogen) (Centi, G. and Perathoner, S., Towards Solar Fuels from Water and $CO_2$, ChemSusChem, 2010, 3, 195-208; Turner, J., et al., Renewable hydrogen production. International Journal of Energy Research, 2008. 32(5): p. 379-407). Hydrogen can be used as a fuel itself or as building block for forming hydrocarbon fuels. However, inefficiency in both of these mechanisms has prohibited them from being a commercially viable option.

Thermochemical processes utilizing ferrite and ceria based materials have been investigated for splitting water into hydrogen and oxygen and for splitting carbon dioxide into carbon monoxide and oxygen. However, both of these processes suffer from low utilization of the oxide phase, and the accompanying requirement of temperatures in excess of 1400° C. to maximize the degree of thermal reduction.

One of the key factors limiting the potential performance of all of these concepts is the inherent properties of the known thermochemically active metal oxide intermediates. Specifically, the degree to which the metal oxide reduces and oxidizes as it is cycled is quite small under reasonably achievable operating temperatures and pressures. That is, a relatively large amount of solid must be processed to produce a small amount of $H_2$ or CO. In fact the degree of reduction per cycle directly impacts the overall efficiency that could possibly be achieved for a given reactor configuration. (Siegel, N. P., Miller, J. E., Ermanoski, I., Diver, R. B., and Stechel, E. B., Factors Affecting the Efficiency of Solar-Driven Metal Oxide Thermochemical Cycles, Ind. Eng. Chem. Res., 2013, 52(9), 3276-86)

The need therefore remains for a more efficient process for generating fuel base stocks via solar thermochemical processes and for thermochemical materials to support those processes.

SUMMARY OF THE DISCLOSURE

In an embodiment of the disclosure, an iron titanium oxide material is disclosed for a thermal oxidation-reduction cycle for splitting $CO_2$ to produce CO, and $O_2$ in isolation from the CO.

In another embodiment of the disclosure, an iron titanium oxide material is disclosed for a thermal oxidation-reduction cycle for splitting $H_2O$ to produce $H_2$, and $O_2$ in isolation from the $H_2$.

In an embodiment of the disclosure, an iron titanium oxide material is disclosed for a thermal oxidation-reduction cycle for splitting a mixture of $CO_2$ and $H_2O$ to produce CO and $H_2$, respectively, and $O_2$ in isolation from the CO and $H_2$.

In an embodiment of the disclosure, a method is disclosed wherein an iron titanium oxide material is used in a thermal oxidation-reduction cycle for splitting $CO_2$ to produce CO, and $O_2$ in isolation from the CO.

In another embodiment of the disclosure, a method is disclosed wherein an iron titanium oxide material is used in a thermal oxidation-reduction cycle for splitting $H_2O$ to produce $H_2$, and $O_2$ in isolation from the $H_2$.

In an embodiment of the disclosure, a method is disclosed wherein an iron titanium oxide material is used in a thermal oxidation-reduction cycle for splitting a mixture of $CO_2$ and $H_2O$ to produce CO and $H_2$, respectively, and $O_2$ in isolation from the CO and $H_2$.

One advantage of the present disclosure is to provide an efficient, new material for use in a thermal oxidation-reduction cycle for the splitting of $CO_2$ and/or $H_2O$.

Another advantage of the present disclosure is to provide a material which exhibits an enhanced quantity of oxygen released upon thermal reduction, and corresponding enhanced quantity of oxygen uptake during re-oxidation by $CO_2$ or $H_2O$ compared to state of the art materials.

Other features and advantages of the present disclosure will be apparent from the following more detailed description of the preferred embodiment.

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete and will fully convey the scope of the invention to those skilled in the art.

According to an embodiment of the present disclosure, a thermal oxidation-reduction cycle material is disclosed which exhibits deeper reduction and re-oxidation characteristics, i.e., release and re-uptake a greater amount of oxygen per unit mass or volume than state of the art materials. The rates of reaction of the disclosed material are superior to those of ferrites, but slower than those of ceria. Since the rates of reaction are surface area-dependent, they may be affected somewhat by the microstructural architecture of the material. These improved characteristics are necessary for these materials to be competitive with and surpass other solar to chemical conversion routes.

According to another embodiment of the disclosure, a method is disclosed that uses thermal energy and the presently disclosed thermal oxidation-reduction cycle materials to decompose $H_2O$ directly into $H_2$ and $O_2$.

The net result of this cycle is the same as direct water splitting, with heat being supplied by concentrated solar energy:

$$Heat + H_2O \rightarrow H_2 + \tfrac{1}{2}O_2,$$

but the conversion is accomplished by splitting the process into two or more reactions using recyclable chemically reactive intermediates. These cycles are characterized by at least one high temperature step in which the chemical reactant is thermally reduced via solar energy, and one or more equivalent temperature or lower temperature water splitting steps which may or may not require a thermal input.

According to another embodiment of the disclosure, a method is disclosed that uses thermal energy and the presently disclosed thermal reduction-oxidation materials to decompose $CO_2$ into $CO$ and $O_2$:

$$Heat + CO_2 \rightarrow CO + \tfrac{1}{2}O_2.$$

The generated CO and $H_2$ may then be combined to form a syngas mixture.

According to another embodiment of the disclosure, a method is disclosed that uses thermal energy and the presently disclosed thermal reduction-oxidation materials to co-produce $H_2$ and CO (syngas) from $H_2O$ and $CO_2$. The syngas mixture can be further processed into various carbon based fuels:

$$Heat + xH_2O + yCO_2 \rightarrow xH_2 + yCO + (x+y)/2 O_2$$

(Chueh, W. C., et al., High-Flux Solar-Driven Thermochemical Dissociation of $CO_2$ and $H_2O$ Using Nonstoichiometric Ceria. Science, 2010. 330(6012): p. 1797-1801; Stamatiou, A., P. G. Loutzenhiser, and A. Steinfeld, Solar Syngas Production via $H_2O/CO_2$-Splitting Thermochemical Cycles with $Zn/ZnO$ and $FeO/Fe_3O_4$ Redox Reactions. Chemistry of Materials, 2010. 22(3): p. 851-859). In fact, the conversion to methane can be integrated into the process under certain conditions for example through the presence of a metallic catalyst, such as Ni (Chueh, W. C. and S. M. Haile, Ceria as a Thermochemical Reaction Medium for Selectively Generating Syngas or Methane from $H_2O$ and $CO_2$. Chemsuschem, 2009. 2(8): p. 735-739).

In general, the cycles all occur in two distinct steps and do not involve any hazardous chemical intermediates. They all involve the high temperature endothermic decomposition of a metal oxide, and a lower temperature gas-splitting step to regenerate the metal oxide and produce $H_2$ and/or CO. The temperatures at which the reduction and re-oxidation occur are dependent to some degree on the gaseous environment, for example, under a low partial pressure of oxygen (achievable using a sweep gas or operation under vacuum) the reduction temperature can be lowered.

The reduction temperature for these materials is greater than or equal to 1280° C. In another embodiment, the reduction temperature may be greater than or equal to 1300° C. The re-oxidation temperature for these materials is below or equal to 1300° C. In an embodiment, the re-oxidation temperature is less than or equal to 1200° C. In another embodiment, the re-oxidation temperature is less than or equal to 1100° C.

The repeated cycles that were performed with the material used a reduction temperature of 1400° C., and a re-oxidation temperature of 1100° C.; in this instance three cycles were measured on the same specimen with similar performance cycle-to-cycle. According to an embodiment, the thermochemical cycles may include thermal reduction at 1400° C. for up to 5 hr, followed by re-ox under $CO_2$ at 1100° C. for up to 10 hr.

According to the present invention, thermochemically-active materials containing iron and titanium oxide for use in a thermal reduction-oxidation cycle for splitting $CO_2$ and/or $H_2O$ to produce CO and/or $H_2$, and $O_2$ in isolation from the CO and/or $H_2$ are disclosed. The material, as synthesized, is a mixture of mainly ferric pseudobrookite ($Fe_2TiO_5$) and rutile ($TiO_2$). This has been confirmed from XRD data. During thermal reduction, some ilmenite ($FeTiO_3$) is formed, i.e., $Fe_2TiO_5 + TiO_2 \rightarrow 2FeTiO_3 + \tfrac{1}{2}O_2$. Upon re-oxidation by $CO_2$, $Fe_2TiO_5$ is the major identifiable phase. $TiO_2$ was not observed (may have gone to amorphous or nano-crystalline form). According to an embodiment, a mixture of iron titanium oxide with a ratio of iron to titanium of approximately 1:1 that enables the formation of ilmenite ($FeTiO_3$) during thermal treatment may be used. Additional iron titanium oxide compounds, such as but not limited to $Fe_2TiO_4$, may be present.

Thermal gravimetric analysis (TGA) data showed that the material can be fully cycled (thermal reduction followed by oxidation with $CO_2$ constitutes one cycle for example) several times without any noticeable change in extent or rate of reaction.

The material may be in powder or monolith form. In an embodiment, the material may be coated upon a substrate. The substrate may be any suitable refractory material such as, but not limited to zirconia, yttria-stabilized zirconia, hafnia, titania, and alumina. The substrate may be in powder or monolith form. In another embodiment, the material may be fabricated to consist of various macro and microporous structures, for example to increase surface area, facilitate gas transport, etc. This may be achieved by any suitable means including, but not limited to nano-casting, self-assembly, templating, and post-synthetic structuring.

In another embodiment, the material may be dispersed in a matrix material to form a composite material. For example, the material may be dispersed in 8 mol % yttria stabilized zirconia (8YSZ). It has been found that disbursement enhances oxygen mobility. The dilution of the "active" phase reduced the overall mass change recorded by TGA, but the rate of reaction was improved. In another embodiment, other or additional matrix materials may be used to improve material performance, such as, but not limited to other oxygen conducting oxides such as zirconia or hafnia.

The material may be prepared by any normal route, including, but not limited to, solid state synthesis, co-precipitation, ignition synthesis, ball-milling, sol-gel methods or a combination thereof, followed by suitable thermal treatment. The material may be formed into a monolithic structure before or after the aforementioned thermal treatment.

According to an embodiment, the thermochemically-active material is used for the generation of reactive chemical species such as carbon monoxide or hydrogen from thermodynamically stable chemical species such as carbon dioxide or water via, for instance, a two-step thermochemical cycle. In the first step of this thermochemical cycle, the material is subjected to high-temperature treatment in an inert or reduced pressure atmosphere. The actual temperature required and "inertness" of the environment are determined by thermodynamics of the material and the composition and pressure of the atmosphere in question. That is, the material could be reduced in unreactive argon or nitrogen, but it could also be reduced in air or other reactive gas (e.g. $CO_2$) as long the temperature and pressure are appropriately chosen. The reaction chamber may be static, or the reaction chamber may be operated continuously by sweeping with a flowing inert gas or continuously pumping to remove the evolved gas. Under these conditions the material evolves oxygen, which may optionally be collected and used in other chemical processes or sold. In the process of evolving oxygen, the material becomes reduced or deficient in oxygen relative to the initial state. A change of chemical phase may or may not occur during the reduction, but may contribute to the driving force of the reaction.

The reduction of the iron titanium oxide material may be represented by the following general expression: $FeTiO_x \rightarrow FeTiO_{x-\delta} + \delta/2O_2$ Furthermore, the following reaction scheme is included as an example of a specific reduction pathway that is supported by results of in situ characterization of the materials during thermochemical cycling: $Fe_2TiO_5 + TiO_2 \rightarrow 2FeTiO_3 + \frac{1}{2}O_2$. It should be realized, however, that the system consisting of iron, titanium, and oxygen contains many possible stoichiometries which are dependent on the temperature and partial pressure of oxygen to which they are exposed (Anovitz, L. M., Treiman, A. H., Essene, E. J., Hemingway, B. S., Westrim, E. F., Wall, V. J., Burriel, R., and Bohlen, S. R., The heat capacity of ilmenite and phase equilibria in the system Fe—Ti—O, Geochimica et Cosmochimica Acta, 49, 2027-40, 1985); the reactions listed in this patent application are indicative of some possible pathways, and should not be considered an exclusive list.

In the second stage of the process the reduced material is exposed to a thermodynamically-stable, oxygen-containing chemical species, such as carbon dioxide or water or even a mixture of both, at a lower temperature, e.g., 1100° C. or less. Again the chamber may be static or under flow. During this second stage of the cycle the reduced material re-oxidizes by removing oxygen atoms from the thermodynamically-stable chemical species with which it is in contact. The result is the formation of carbon monoxide (from carbon dioxide) or hydrogen (from water) which may be collected, and the restoration of the metal oxide to its initial state. Once carbon monoxide and hydrogen have been collected (the combination of the two is commonly referred to as syngas), synthetic fuels, or other hydrocarbons, may be readily synthesized through well-established chemical processes. The thermochemical cycle is repeatable, i.e., once step two is complete, step one may be conducted again, followed by step two, and so on, resulting in a continuous or semi-continuous operation.

The re-oxidation of the reduced iron titanium oxide material may be represented by the following general expressions: $FeTiO_{x-\delta} + \delta CO_2 \rightarrow FeTiO_x + \delta CO$ and $FeTiO_{x-\delta} + \delta H_2O \rightarrow FeTiO_x + \delta H_2$ Furthermore, the following reaction schemes are included as examples of specific re-oxidation pathways that are supported by results of in situ characterization of the materials during thermochemical cycling: $2FeTiO_3 + CO_2 \rightarrow Fe_2TiO_5 + TiO_2 + CO$ and $2FeTiO_3 + H_2O \rightarrow Fe_2TiO_5 + TiO_2 + H_2$ The particular benefit of the composite materials described herein is the degree to which they may be reduced and re-oxidized during the two-step thermochemical cycle, which is significantly higher than for materials in the prior art. This high degree of reaction equates to greater achievable quantity of carbon monoxide, hydrogen, etc. production per unit mass of material used compared to prior art materials. This in turn promises to equate with greater achievable energy efficiency for example in a solar driven process.

EXAMPLE 1

An iron oxide/titanium oxide material was prepared by dissolving titanium butoxide in ethanol and adding citric acid with stirring. A separate solution of iron acetate in ethanol was prepared and added to the titanium butoxide/citric acid solution. The resulting gelatinous solution with an iron:titanium atomic ratio of approximately 1:1 was stirred for 2 hours then excess solvent was removed at 70° C. The dried solid was then calcined at 400° C. Finally a high-temperature treatment at 900° C. in air was conducted to allow the chemical components in the material to react with one another and/or produce a sintered form of the material that would undergo little physical change upon thermochemical cycling.

The material was subjected to one or more reduction-reoxidation cycles under argon and carbon dioxide atmospheres, respectively, in a thermogravimetric analyzer (TGA). The mass of the sample was monitored continuously during the cycling procedure. During thermal reduction under flowing argon gas at 1400° C. the sample mass decreased due to evolution of oxygen from the material. Upon cooling the sample to approximately 1100° C. and exposing it to carbon dioxide, the sample mass increased as the material became re-oxidized by removing oxygen atoms from the carbon dioxide gas. Similar reduction-re-oxidation TGA cycles were performed on materials which represent prior art.

Table 1 summarizes the TGA results for a series of samples including the material of example 1, and others representative of the prior art. The data is listed as the increase in mass of sample in percent during exposure of the thermally-reduced material to carbon dioxide. (The mass loss during the subsequent reduction cycle was similar to the mass gain.) The mass change (whether it is mass loss upon reduction or mass gain upon re-oxidation) is a measure of how much of the material is reacting, which is directly proportional to the amount of carbon monoxide or hydrogen that is produced.

TABLE 1

Summary of TGA data for metal oxides subjected to thermochemical cycling

| Material | Mass increase during re-oxidation [a]/% |
|---|---|
| Iron titanium oxide (example 1, this invention) | 1.20 |
| Iron oxide/yttria-stabilized zirconia; 28 mol-% Fe (prior art) | 0.18 |
| Iron oxide/yttria-stabilized zirconia; 4.5 mol-% Fe (prior art) | 0.12 |
| Ceria (prior art) | 0.37 |
| Ceria/yttria-stabilized zirconia (prior art) | 0.48 |

[a] mass increase is referenced to the mass of material before thermal reduction = 100%; thermal reduction under argon at 1400° C. for 5 hr; re-oxidation under carbon dioxide at 1100° C. for 10 hr.

The material described in Example 1 offers significant enhancements in performance for thermochemical production of carbon monoxide and hydrogen than state of the art materials. The material of Example 1 exhibits overall mass loss upon reduction and mass gain upon re-oxidation which are far above those displayed by the prior art materials.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for generating a fuel or fuel precursor, comprising:
    thermally reducing a mixture comprising ferric pseudobrookite and rutile not in the presence of a fuel to a reduced iron titanium oxide with an atomic ratio of iron to titanium of 1:1 and oxygen by heating the mixture with concentrated solar energy to react the ferric pseudobrookite and rutile;
    reacting the reduced iron titanium oxide with a reactant to form a product and ferric pseudobrookite.

2. The method of claim 1, wherein the reduced iron titanium oxide comprises ilmenite.

3. The method of claim 1, wherein the reactant is $H_2O$ and the product is hydrogen.

4. The method of claim 1, wherein the reactant is $CO_2$ and the product is carbon monoxide.

5. The method of claim 1, wherein the reactant is a mixture of $H_2O$ and $CO_2$ and the product is a mixture of hydrogen and carbon monoxide.

6. The method of claim 1, wherein the mixture is dispersed in an yttria stabilized zirconia matrix.

7. The method of claim 1, wherein thermally reducing is at a temperature greater than or equal to 1280° C.

8. A concentrated solar energy thermal cycle method, comprising:
    heating a mixture comprising ferric pseudobrookite and rutile not in the presence of a fuel to a reduction temperature by concentrated solar energy to cause a reduction reaction between the ferric pseudobrookite and rutile to produce reduced iron titanium oxide with a ratio of iron to titanium of 1:1; and
    reducing a feedstock material by reacting the feedstock material with the reduced iron titanium oxide to form a product material and ferric pseudobrookite; and
    repeating the heating and reducing steps.

9. The method of claim 8, wherein the feedstock material comprises $H_2O$.

10. The method of claim 8, wherein the feedstock material comprises $CO_2$.

11. The method of claim 8, wherein the reactant is a mixture of $H_2O$ and $CO_2$ and the product is a mixture of hydrogen and carbon monoxide.

12. The method of claim 8, wherein the mixture is dispersed in an yttria stabilized zirconia matrix.

* * * * *